United States Patent [19]

Eger et al.

[11] Patent Number: 5,222,623
[45] Date of Patent: Jun. 29, 1993

[54] COVERED DRINKING VESSEL

[75] Inventors: Douglas R. Eger, 3412 Yoakum, Houston, Tex. 77006; Douglas W. Smith; Robert E. Dawson, both of Ridgefield, Conn.

[73] Assignee: Douglas R. Eger, Houston, Tex.

[21] Appl. No.: 746,107

[22] Filed: Aug. 15, 1991

[51] Int. Cl.$^5$ .............................................. A47G 19/22
[52] U.S. Cl. ................................... 220/715; 220/714; 220/254; 222/472
[58] Field of Search ............... 220/714, 715, 254; 222/472, 509, 505, 518

[56] References Cited

U.S. PATENT DOCUMENTS

| 195,376 | 6/1963 | Curtis. | |
|---|---|---|---|
| D. 258,484 | 3/1981 | Slepicka. | |
| 286,967 | 12/1986 | Appel. | |
| 2,447,870 | 8/1948 | Polcyn | 220/715 |
| 3,760,972 | 9/1973 | McKirnan. | |
| 3,847,311 | 11/1974 | Flores et al. | 220/254 X |
| 3,964,609 | 6/1976 | Perrella | 220/254 X |
| 3,964,631 | 6/1976 | Albert | 220/715 |
| 3,967,748 | 7/1976 | Albert | 220/715 |
| 3,972,443 | 8/1976 | Albert | 220/715 |
| 4,094,433 | 6/1978 | Numbers | 220/715 |
| 4,099,642 | 7/1978 | Negard | 220/715 |
| 4,133,446 | 1/1979 | Albert | 220/715 |
| 4,136,799 | 1/1979 | Albert | 220/715 X |
| 4,212,408 | 7/1980 | Valenzona. | |
| 4,276,992 | 7/1981 | Susich. | |
| 4,303,173 | 12/1981 | Nergard. | |
| 4,489,840 | 12/1984 | De Freitas. | |
| 4,676,411 | 6/1987 | Simasaki | 222/472 X |
| 4,779,754 | 10/1988 | Ten Eyck et al.. | |
| 5,037,015 | 8/1991 | Collins | 222/472 |

Primary Examiner—Allan N. Shoap
Assistant Examiner—Paul A. Schwarz
Attorney, Agent, or Firm—Browning, Bushman, Anderson & Brookhart

[57] ABSTRACT

A drinking vessel comprises a hollow cup having an upper rim defining a mouth opening. A lid removably mounted on the cup extends across the mouth opening to prevent spilling of liquid from the cup. The lid includes a base so mounted on the cup and having a flange extending inwardly from the cup's rim partly across the mouth opening and defining a port aligned with an inner part of the mouth opening. The lid further includes a valve element in register with the port, a seal on the valve element underlying the flange, and an actuator adjoining the valve element and disposed laterally outwardly thereof, such that when the actuator is depressed by downward force of the user's thumb, the valve element pivots downwardly, separating the seal from the flange. A spring normally biases the valve element upwardly with the seal against the flange.

19 Claims, 5 Drawing Sheets

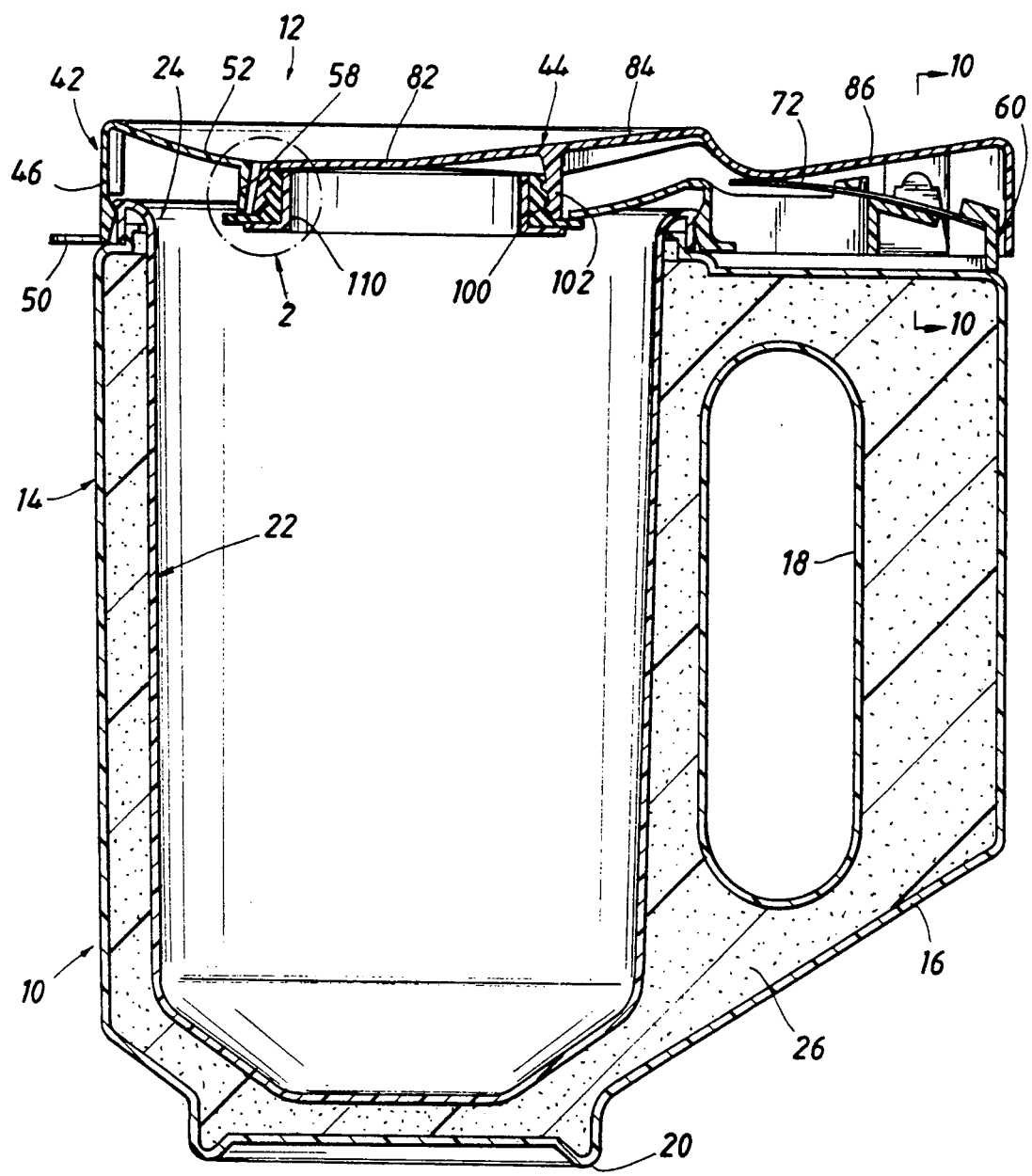

COVERED DRINKING VESSEL

BACKGROUND OF THE INVENTION

Field of the Invention

The present invention pertains to covered vessels, such as so-called "commuter mugs." Such vessels usually include a cup, often with a handle, and a cover or lid to prevent liquid within the cup from spilling, e.g. if the cup is carried in a moving vehicle. However, such vessels can, of course, also be used in any environment, and in any case, their covers can also perform other functions. For example, such a cover may help to insulate either a hot or cold beverage, or if the cup is being used outdoors, the cover may help to prevent windborne dust, leaves, or the like from being blown into the cup.

In such a cup, the lid is usually equipped with some type of valve which allows the user to drink from the cup without removing the entire lid.

Such cups as are currently available have room for improvement, particularly in the area of ergonomics, but also in other areas. For example, many such cups have a valve arrangement which opens only a very small hole in the lid, and the effect of drinking from such a hole may be uncomfortable. The hole is often formed in a generally flat lid member which is recessed sharply down from an upstanding rim perpendicular thereto. This can increase the discomfort of drinking from the hole and/or can allow liquid emerging from the hole to flow all over the flat surface before being drunk, thereby messing the outside of the lid and potentially picking up the very contamination which the lid would otherwise exclude from the liquid. Prior attempts to remedy this situation have only been partly successful, and have resulted in asymmetrical, and relatively unattractive designs.

Another problem with such prior art cups is that they are often only convenient for drinking by a right-handed person, or perhaps by a left-handed person, but a given cup is not comfortable for right-handed people as well as left-handed people.

Still other problems revolve around the mechanism for operating the valve. In some prior art devices, the valves, or in some cases, the entire lids, open outwardly. Although this can be accomplished with a fairly simple actuating mechanism, it can interfere with the user's face. On the other hand, prior art valves opening inwardly have typically been actuated by undesirably complicated mechanisms.

Still other problems with the prior art actuating mechanisms again have to do with ergonomics, as when the action which must be performed by the user in order to open the valve does not so easily arise from a natural position of he fingers and the hand while holding the cup for drinking.

SUMMARY

In the present invention, the drinking vessel comprises a hollow cup and a cover or lid assembly removably mounted across the mouth of the cup. The lid assembly includes a base with a flange which extends inwardly from the rim of the cup partly across the mouth opening of the cup and defines a port, over an inner part of the cup mouth, for egress of liquid. The lid assembly also includes a valve member pivotly mounted on the base and including a valve element in register with the port. The pivotal mounting is such that the valve element moves downwardly into the cup to open the port, rather than up toward the user's face, and whereby it also avoids dripping any liquid which may be clinging to the underside of the valve element onto the outside of the lid assembly, or worse yet, the user's lap or surroundings. Yet, this action is accomplished by a very simple mechanism requiring only a pivotal connection between lateral extensions of the valve element and base along with a spring, also cooperative between those extensions, for biasing the valve element into its upper or closed position. When in this position, a seal carried on the valve element underlies the flange on the base to seal the port.

Actuation is by simple downward pressure of user's thumb on an upwardly facing surface of the valve extension or tab which extends laterally outwardly from the valve element. In preferred embodiments, this tab overlies the handle of the cup, so that when the user is holding the cup in a natural position, his thumb is already placed on or near the contact surface which must be pressed in order to operate the actuator and open the valve.

It is believed that one of the reasons prior art mugs often utilize relatively small ports is to try to minimize the messiness of liquid outside the vessel. However, the present inventor has found that such an arrangement merely leaves a relatively large surrounding surface area on which liquid can accumulate, and even pass back into the cup or into the user's mouth after being contaminated on the upper surface of the lid. By way of contrast, preferred embodiments of the present vessel utilize a relatively large port and correspondingly large valve element. When drinking from such a vessel, the user has much the same comfortable feeling as when drinking from an ordinary open cup, and the aforementioned surface area problems are greatly reduce. The reduction in these problems can be further enhanced by providing a relatively gentle downward slope from the rim of the lid to the edge of the port, rather than a sharp perpendicular recess-like configuration.

The large port also makes the same cup conveniently usable by either right-handed or left-handed persons, and this effect can be further enhanced by the configuration of the port and the surrounding flange of the base, the latter being thinner at one, or preferably two, drinking locations generally 90° from the cup handle.

The cup portion may be very simply comprised of two injection-molded synthetic parts, an outer cup wall, which also defines the handle, and an inner cup wall, which is spaced from the outer wall except at the upper rim of the cup where the two are connected. The space between these two walls may be filled with an insulation material, which can also serve to help bond the two walls together. The lid assembly also has only two major parts, each of which can be injection molded of synthetic material, i.e. the base and the valve member. Even the pivotal mounting and/or holders for the spring can be integrally molded on these two members.

Even though the construction of such a cup is relatively simple, it actually improves the ergonomics and general performance, as described above, and in addition, lends itself to a relatively attractive overall vessel design.

Various objects, features and advantages of the invention and preferred embodiments thereof will be made apparent by the following detailed description, the drawings, and the claims.

DETAILED DESCRIPTION OF THE DRAWINGS

FIG. 1 is a longitudinal cross-sectional view of a covered cup according to the present invention in a plane passing through the handle.

FIG. 2 is an enlarged detailed view of the area in the phantom circle 2 of FIG. 1.

DESCRIPTION

Figure 7:
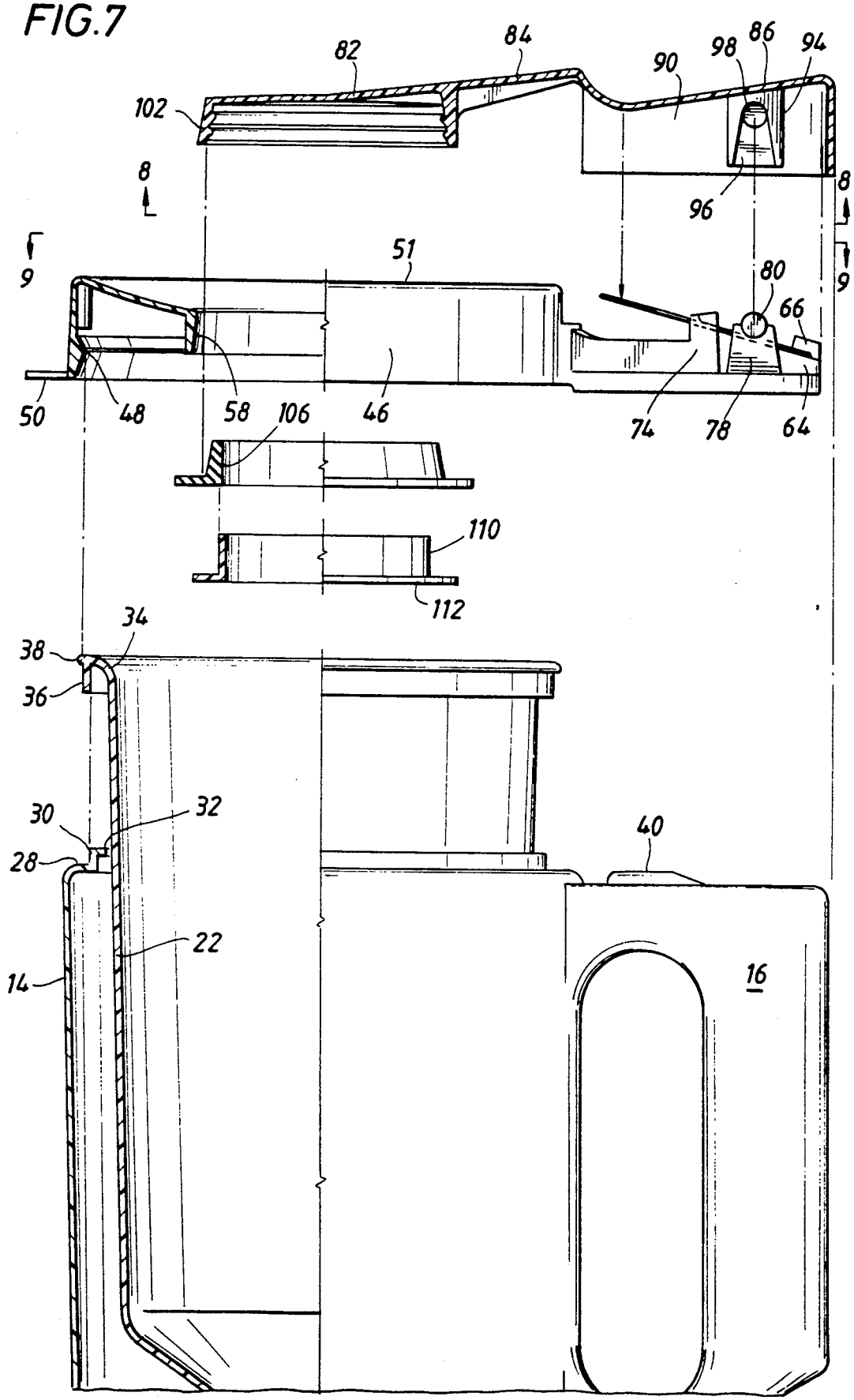
FIG. 7 is an exploded view, in longitudinal quarter-section, except for the valve member, which is shown in full cross-section.

Referring now to the drawings, and first to FIG. 1, the vessel comprises two main sub-assemblies, the cup or vessel proper 10 and the over or lid assembly 12. Each of these, in turn, includes two main parts, with each of those main parts being monolithically formed, preferably by injection molding, of a suitable synthetic material. The two main parts of the cup 10 are an outer wall 14 which defines a handle 16 having a grip opening 18 as well as a lower annular foot 20. Referring to FIG. 7, an indexing formation 40, the function of which will be described more fully below, is integrally molded in upstanding relation to handle 16.

The other main part of the cup is the inner wall or liner 22 which lies within outer wall 14 and defines the actual liquid containing hollow of the cup. Herein, terms such as "radially" are used with reference to wall 22. Outer and inner walls 14 and 22 are spaced apart except at their upper ends, where they are connected and form an annular rim, which in turn defines the open mouth 24 of the cup. The space between the inner and outer walls 22 and 14 may be filled with an insulation material, such as a suitable foam 26. The foam may be of a type which can be emplaced within outer wall 14 before insertion of inner wall 22, while the foam is still moist and fluid, or at least deformable, and later sets, adhering to both walls 14 and 22, thereby helping to bond them together. For clarity of illustration, the insulation material has been omitted from all views except FIG. 1.

Figure 5:
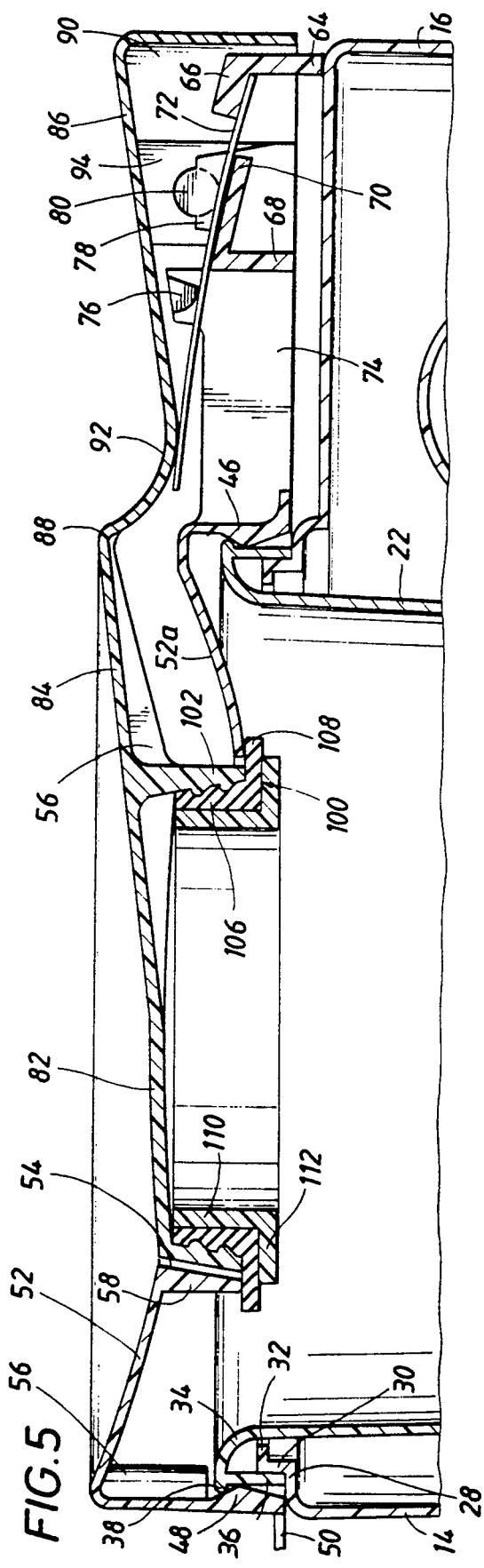
FIG. 5 is an enlarged detailed cross-sectional view of the upper portion of the cup, taken in the same plane as that of FIG. 1, showing the valve in closed position.

Referring now more specifically to FIGS. 5 and 7, the upper end of outer wall 14 has a generally in-turned annular flange 28, the inner portion of which is stepped in configuration, including an upwardly extending run 30 and inwardly extending run 32. The upper end of inner wall 22 curves outwardly as shown at 34, and just inwardly of the outer extremity, an annular flange 36 extends downwardly, so that an annular bead 38 is formed at the upper outer extremity. Flange 36 bounds a downwardly opening recess, which is sized to receive the stepped portion 30, 32 of flange 28 when the two parts of the cup are assembled, as shown in FIG. 5. Thus, the upper rim of the cup is defined by the inner wall 22, which enhances sealing properties both with respect to the lid in general and as between the two main parts 14, 22 of the cup itself. The bead 38 forms a snap-type retainer for the lid or cover assembly, as will be described more fully below.

Referring now to all FIGS., the two main parts of the cover or lid assembly are the base member 42 and the valve member 44. The base member 42 includes a generally cylindrical connection portion 46 which is inclined slightly outwardly and downwardly. On the inner side of connection portion 46 there is formed an annular radial projection 48 having inclined upper and lower surfaces and being sized to snap over bead 38 to releasably retain the cover assembly in place on the cup 14, 22. On the side opposite handle 16, there is formed a lift tab 50 which extends radially outwardly from the lower end of connection portion 46 to assist in removal of the cover from the cup.

The base member further includes a ring-shaped flange 52 which extends generally radially inwardly from the upper end of connection portion 46 partially across the open mouth 24 of the cup. As used herein, "ring-shaped" is broader than "annular" in that it denotes a closed member, open in the center, but not necessarily circular in shape; thus, for purposes of this specification, a "ring-shaped" member can be oval, or even polygonal or irregular in shape. The intersection between connection portion 46 and flange 52, which forms a drinking rim 51, is rounded, and may be reinforced by integrally molded stiffeners, circumferentially spaced about the base member, and one of which is shown at 56. Flange 52 not only extends radially inwardly, but is also inclined gently downwardly from its outer to its inner extremities, for comfort in drinking. This gentle sloping of the flange 52 also causes any liquid which may splash or run onto the flange to flow almost immediately back through the central port 54 defined by the inner extremity of flange 52, so that such liquid does not run over the diameter of the cover, dry on the exterior of the cover, spill elsewhere, or the like. Also, the port 54 is relatively large, occupying a substantial portion, i.e. at least about half, of the cross-sectional area of the mouth of the cup. Contrary to conventional thinking, it is relatively uncommon for liquid to be spilled while the user is actually drinking unless the cup is being used on extremely turbulent seas or the like. That being the case, providing a large port 54, and a relatively small surrounding upper surface 52 makes for less surface area potentially wetted by the liquid in the cup. By way of contrast, in those commuter mugs in which only a very small hole is provided, it is virtually unavoidable that liquid emerge onto the surrounding surface, and indeed the user may be in effect drinking from a hollowed cup cover which forms a sort of secondary vessel. Clearly, when the latter happens, much of the exterior surface area of the cover is wetted, and may become sticky or otherwise unpleasant.

On the side adjacent handle 16, flange 52 is recessed downwardly as shown at 52a. The unrecessed portion of flange 52 has a skirt 58 extending downwardly from its inner extremity, with its lower edge flush with the underside of recessed portion 52a, so that they jointly define a planar annular surface against which the seal, to be described below, can seat.

Base member 42 also includes an integrally molded lateral extension 60 which generally overlies the upper surface of handle 16. Extension 60 generally comprises a pair of converging legs 62 which are joined at their outer extremities as indicated at 64. Connecting portion 64 extends generally vertically, and has a tab 66 extending inwardly, i.e. toward the main body of the cup, from its upper end. Inwardly of member 64 is another upstanding element 68, likewise extending transversely across between legs 62, and having a tab 70 extending outwardly from its upper end. Tab 70 is inclined slightly downwardly and outwardly, and is positioned so that, if extended, it would intersect connecting portion 64 slightly below its respective tab 66, which is inclined generally parallel to tab 70. Thus, the outer or fixed end of a leaf spring 72 can be held between tabs 66 and 70. Legs 62 have inwardly projecting blocks 74, which in turn carry downwardly projecting ears 76 on their inner sides. Ears 76 bear on the upper surface of spring 72 on the opposite side of tab 70 from tab 66, further helping to retain spring 72 in place, and also to control its movements. The function of the spring 72 and its relation to the valve member of the cover will be described below.

Legs 62 carry integrally molded upstanding pivot supports 78 adjacent tab 70, and each support 78 carries an outwardly projecting pivot pin member 80. With the exception of the leaf spring 72 carried thereby, all parts of the base member, as described thus far, are integrally, and more specially monolithically, molded.

As mentioned above, the other main pat of the cover lid assembly is the valve member 44. The valve member 44 includes a flap-type valve element 82 slightly smaller than, but corresponding in shape to, the port 54, so that it can open downwardly through port 54. When the apparatus is assembled, and the valve is closed, the valve element 82 lies generally in alignment with port 54, as shown for example in FIG. 5. Extending laterally outwardly from the valve element 82 is an actuator comprising an extension in the form of a tab having an inner part 84 and an outer part 86. Part 84 is slightly smaller than, but corresponding in shape to, recessed portion 52a of flange 54, and overlies recessed portion 52a when the valve is closed. The recess 52a allows part 84 to move downwardly with valve element 82 in opening the valve. Part 84, and an adjacent portion of the valve element 82 are inclined gently upwardly and radially outwardly, terminating in a rounded edge 88 which lies flush with the upper rim 51 of the base of the cover assembly.

The outer part 86 of the valve extension generally overlies the extension 60 of the base 42, and thus also overlies handle 16. Referring to FIG. 10, and once again to the extension 60 of the base member, the two legs 62 are cornered and widened, as indicated at 62a, to provide a recess 62 for receipt of formation 40 on the upper end of handle 16. This serves to circumferentially index the base member 42, i.e. to keep its extension 60 in overlying relation to the handle 16. The outer part 86 of the valve extension, in turn, has a cowl 90 extending downwardly from its sides and outer end and sized to extend down over the upper portion of legs 62 and the pivot and spring mounting parts carried thereby. There is, however, enough clearance between the lower edge of cowl 90 and the handle 16 to permit the pivotable movement described below.

Just outwardly of corner 88, the outer part 86 of the valve extension is curved downwardly to form a primarily facing concave contact surface 92 for comfortably receiving the user's thumb when holding the cup in a natural way for drinking. This curvature also brings the curved part of the valve extension into contact with the free end of spring 72.

Figure 10:
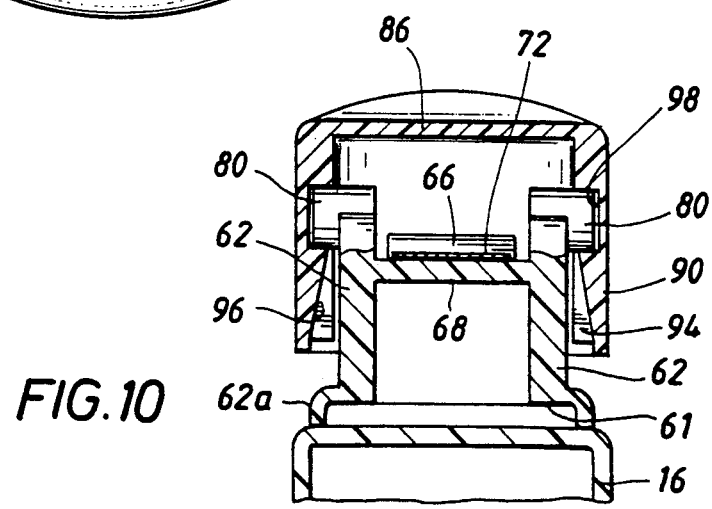
FIG. 10 is an enlarged detailed cross-sectional view taken on he line 10—10 of FIG. 1.

On the inside of the opposed side portions of cowl 90 there are formed block-like structures 94 into which are formed cylindrical recesses 98. Below the recesses 98, the inner sides of the blocks 94 are inclined downwardly and outwardly, as shown in FIG. 10 at 96. In assembling the device, the base extension 60 is urged upwardly into the cowl 90. Inclined surfaces 96 will cam the pivot pins 80 in toward each other, such action being permitted by the resilience of the materials of which the base and/or valve extensions are formed, until the pins 80 snap into the recesses 98. This not only provides a pivotal connection between the two extensions, but also properly positions the two extensions so that they cannot move upwardly, downwardly, radially, or circumferentially with respect to each other, such movements being defined with respect to the axis of the cup as a whole.

Figure 6:
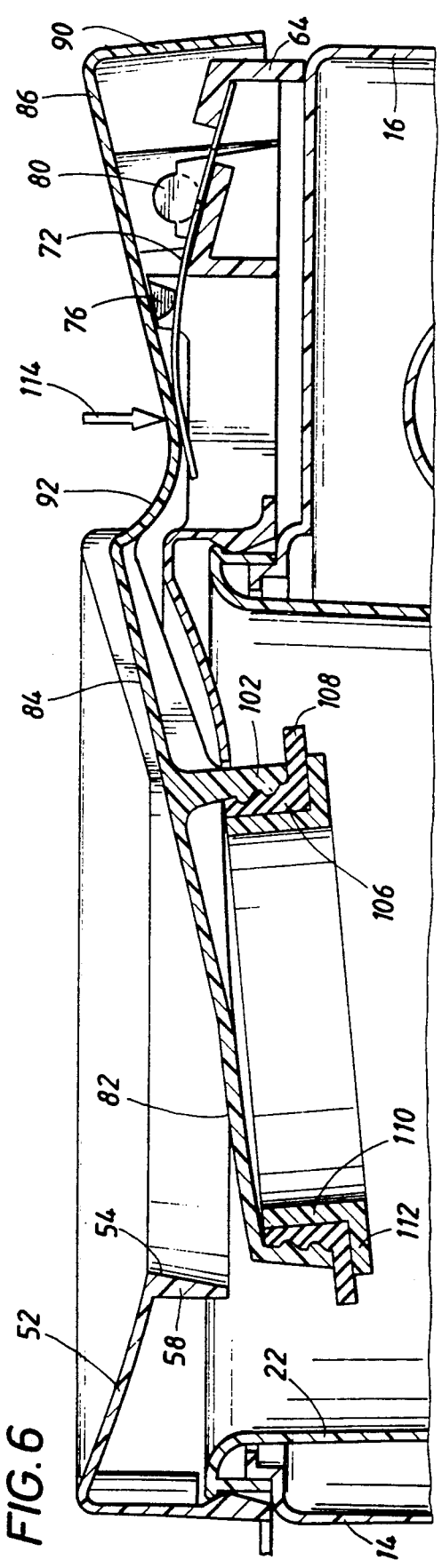
FIG. 6 is a view similar to that of FIG. 5 showing the valve in open position.

Referring to FIGS. 5 and 6, it can be seen that the abutment of spring 72 with the curved part of the valve extension beneath contact surface 92 tends to urge the adjacent valve element 82 upwardly. This urges a seal 100 carried by the valve element into engagement with the underside of flange 52. More specifically, the valve element 82 has a seal carrier 102 extending downwardly therefrom into the port 54. Seal carrier 102 is ring-shaped, and more specifically frustoconical, corresponds generally to the shape of port 54, and is sized to lie fairly closely adjacent that port, abut with enough clearance to permit the pivotal movements to be described. As best shown in FIG. 2, the radially inner side of seal carrier 102 has irregular formations, more specifically beads 104, projecting therefrom.

The parts of the valve member 44 described thus far are integrally, and more specifically monolithically, molded of a suitable synthetic material. This molded piece carries two other ancillary parts of the valve member or sub-assembly. One is the seal 100, previously mentioned. Referring to FIGS. 2, 5 and 7, the seal 100 includes an upstanding ring-shaped mounting portion 106, the outer surface of which is slightly conical, generally corresponding in inclination to the seal carrier 102. Portion 106 is generally sized to fit within seal carrier 102. Seal 100 also includes a lip 108 extending radially outwardly from the bottom of mounting portion 106 far enough to underlie the skirt 58 of flange 52. To retain seal 100 on the seal carrier 102, a retainer ring 110 is interference fitted into the mounting portion 106 thereby deforming mounting portion 106 into and about the beads 104, as shown in FIG. 2, and also clamping mounting portion 106 between the retaining ring 110 and the seal carrier 102. Retaining ring 100 also has a radially outwardly extending flange 112 at its lower end. This flange partially underlies and supports the sealing lip 108, but does not extend radially outwardly as far as lip 108. Specifically, flange 112 stops short of alignment with skirt 58.

The parts are sized and oriented so that, when the valve element 82 is urged into its upper or closed position by spring 72, as shown in FIG. 5, lip 108 of the seal will underlie and engage the skirt 58 and the underside of recessed portion 52a of flange 52. When the user presses downwardly on the contact surface 92, as indicated by arrow 114 in FIG. 6, the inner part 84 of the valve extension pivots down with respect to outer part 86, as shown, so that valve element 82 can be moved downwardly into the cup against the bias of spring 72 to allow the user to drink liquid from port 54. When the user is finished drinking, and releases the pressure of his thumb, the spring 72 will automatically return the valve element 82 to the closed position shown in FIG. 5.

Figure 3:
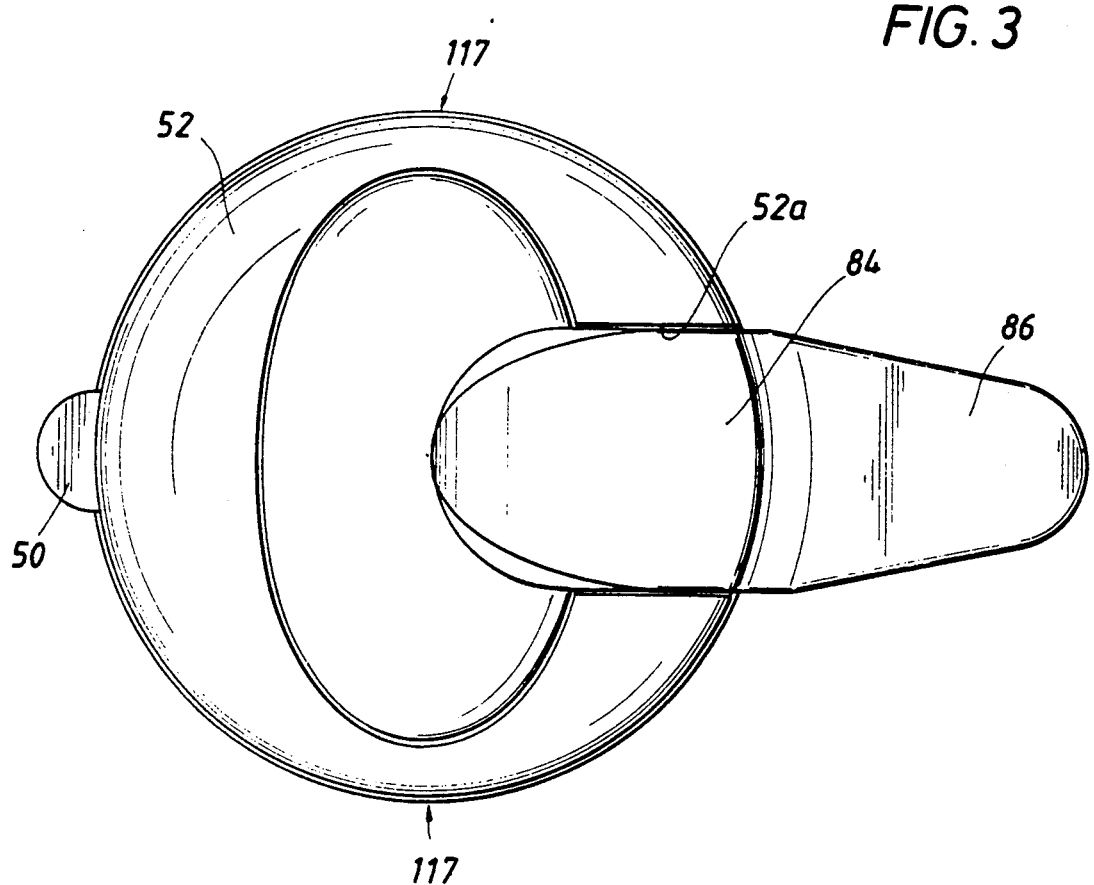
FIG. 3 is a top plan view of the cup.
Figure 4:
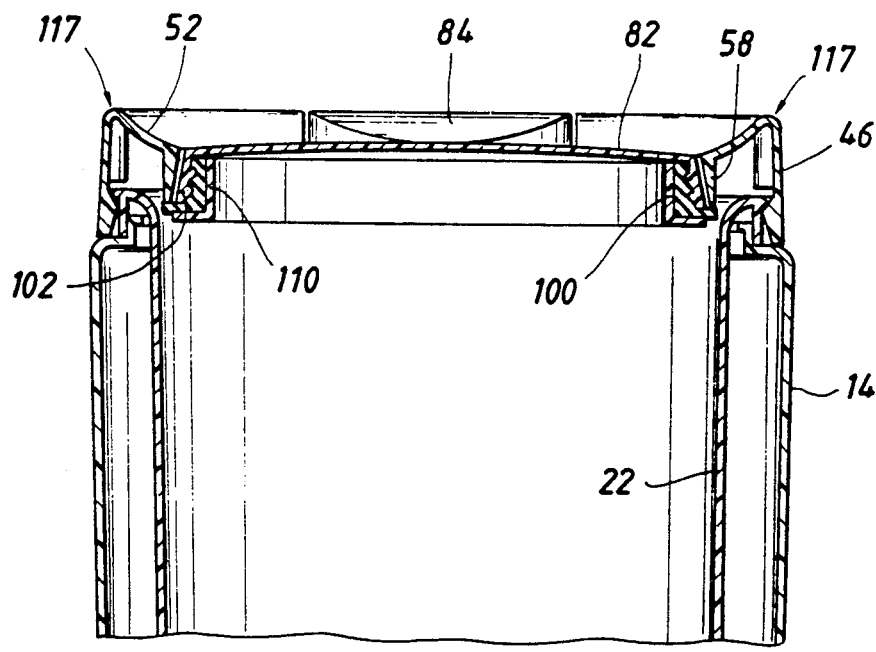
FIG. 4 is a longitudinal cross-sectional view of the upper portion of the cup taken at right angles to the view of FIG. 1.
Figure 8:
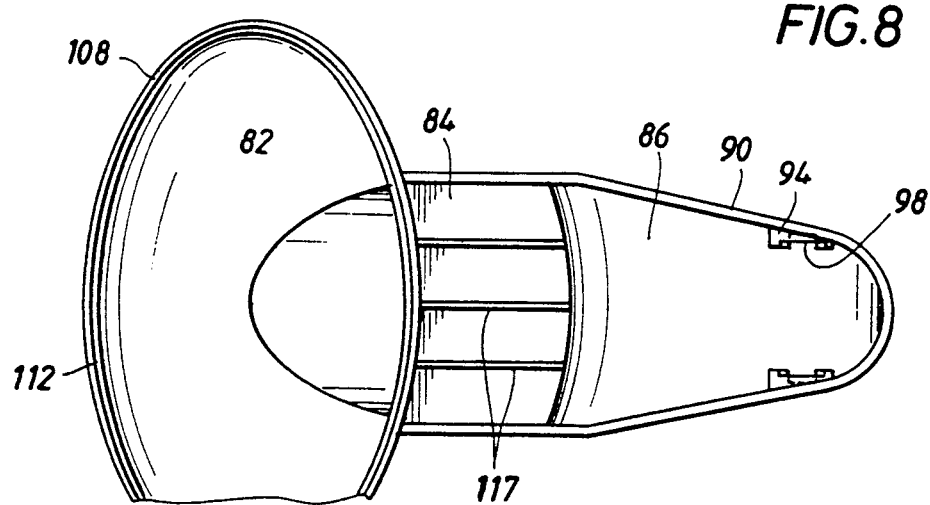
FIG. 8 is a bottom plan view of the valve member of the lid assembly taken on the line 8—8 of FIG. 7.
Figure 9:
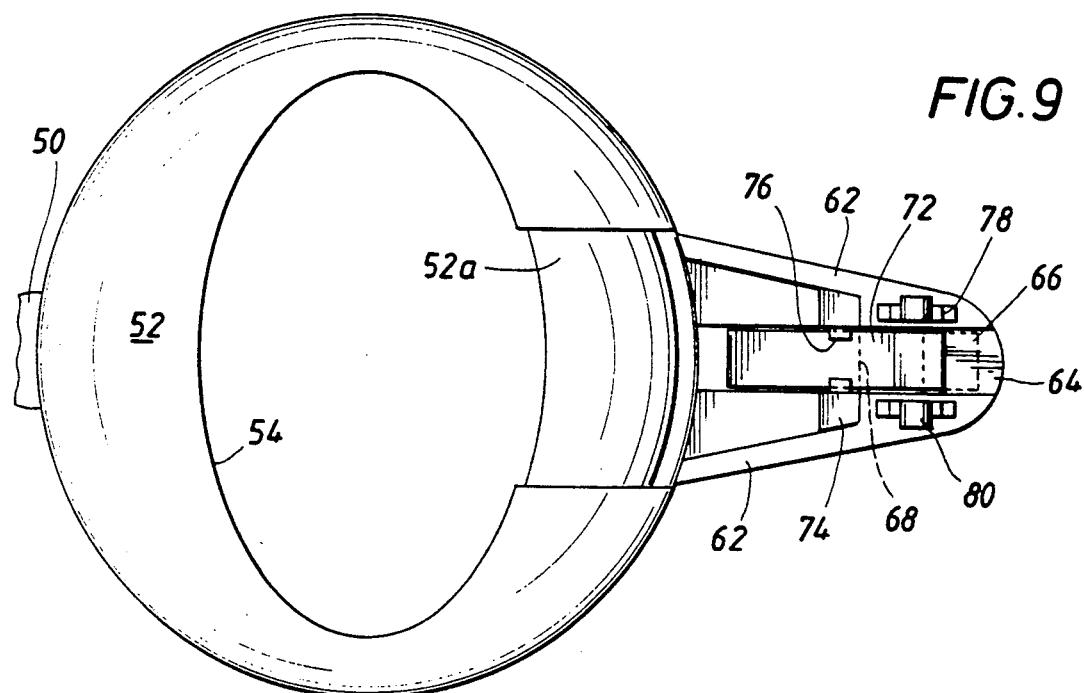
FIG. 9 is a top plan view of the base member of the lid assembly taken on the line 9—9 of FIG. 7.

Referring to FIGS. 3, 8 and 9, and also comparing FIGS. 5 and 4, the port 54, valve element 82, and related parts such as seal 100 are oval-shaped, with the long lateral dimension thereof lying perpendicular to the central plane of the handle 16, i.e. the plane of FIGS. 1 and 5. The flange 52 has correspondingly wider and narrower portions, the narrower portions being at drinking positions 117, each of which is approximately 90° from handle 16. This enhances the drinking comfort for both right-handed and left-handed persons.

Numerous modifications of the preferred embodiment described above and shown in the drawing will suggest themselves to those of skill in the art. By way of example only, the port 54 and corresponding valve element 82 can take many other forms from those shown. While it is convenient to mold the pivot and spring-holding formations onto or into the two main parts 42 and 44 of the cover assembly, it would also be possible to separately form at least some of these parts. Conversely, while the spring 72 as shown is a separate metal leaf spring, by a suitable choice of materials, it might be possible to provide a spring integrally or monolithically molded onto one of the two main cover parts, or even to provide the valve tab part 84 with sufficient inherent resilience to serve as its own spring, or even to provide its own flexure point, thereby eliminating the need for a true pivot connection. Likewise, the precise configuration of the seal, and the means whereby it is mounted on the valve element, could be changed. As mentioned, these are only exemplary modifications, and it is therefore intended that the scope of the invention be limited only by the claims which follow.

What is claimed is:

1. A drinking vessel comprising:
   a hollow cup having an upper rim defining a mouth opening and also having a handle;
   a lid assembly removably mounted on said cup and extending across said mouth opening, said lid assembly comprising
      a base member so mounted on said cup and having a flange extending radially inwardly from said rim partly across said mouth opening and defining a port disposed over a portion of said mouth opening inwardly of said rim;
      a valve member pivotally mounted on said base member and comprising a valve element in register with said port, a seal on said valve element at least partially underlying said flange, an actuator comprising a valve extension rigidly adjoining said valve element and projecting laterally outwardly therefrom and overlying said handle, said valve extension having a primarily upwardly facing contact surface, said pivotal mounting being about an axis adjacent said valve extension such that, when said valve extension is depressed by downward force on said contact surface, an inner part of the valve expression pivots down so that said valve element moves downwardly, separating said seal from said flange;
      and a spring cooperative between said base member and said valve member and operative to bias said valve element upwardly with said seal against said flange.

2. The device of claim 1 wherein said pivotal mounting is disposed laterally outwardly of said contact surface.

3. The device of claim 2 wherein said contact surface is concave.

4. A drinking vessel comprising:
   a hollow cup having an upper rim defining a mouth opening and also having a handle;
   a lid assembly removably mounted on said cup and extending across said mouth opening, said lid assembly comprising
      a base member so mounted on said cup and having a flange extending radially inwardly from said rim partly across said mouth opening and defining a port disposed over a portion of said mouth opening inwardly of said rim, said flange having a downwardly recessed portion;
      a valve member pivotally mounted on said base member and comprising a valve element in register with said port, a seal on said valve element at least partially underlying said flange, an actuator comprising a valve extension rigidly adjoining said valve element and projecting laterally outwardly therefrom, said valve extension overlying said handle, and said valve extension being sized for receipt in said recessed portion of said flange, said valve extension having a generally upwardly facing contact surface, said pivotal mounting being such that, when said valve extension is depressed into said recessed portion of said flange by downward force on said contact surface, said valve element pivots downwardly, separating said seal from said flange;
      and a spring cooperative between said base member and said valve member and operative to bias said valve element upwardly with said seal against said flange.

5. The device of claim 4 wherein said base member comprises a base extension lying generally along said handle and at least a portion of said valve extension; said spring and said pivotal mounting being cooperation between said extensions.

6. The device of claim 5 wherein the unrecessed portion of said flange has a skirt depending downwardly from its inner edge to lie generally in alignment with the recessed portion; and
   wherein said seal is ring-shaped and has a ring-shaped lip extending radially outwardly to underlie and engage the undersides of said skirt and said recessed portion when said valve is closed.

7. The device of claim 5 wherein said valve element has a ring-shaped seal carrier extending downwardly therefrom, and said seal has an upstanding ring-shaped mounting portion disposed in said carrier, and further comprising a retainer ring interference fitted into said mounting portion and thereby clamping said mounting portion in tight engagement with said carrier, said seal further comprising a ring-shaped lip extending radially outwardly from a lower part of said mounting portion to underlie and engage said flange when said valve is closed.

8. The device of claim 7 wherein said carrier has an irregular inner surface into which said mounting portion is deformed when so clamped.

9. The device of claim 7 wherein said retainer ring has a support shelf extending radially outwardly beneath and in engagement with said lip, but terminating radially inwardly of said flange.

10. A drinking vessel comprising:
a hollow cup having an upper rim defining a mouth opening and also having a handle;
a lid assembly removably mounted on said cup and extending across said mouth opening, said lid assembly comprising
a base member so mounted on said cup and having a flange extending radially inwardly from said rim partly across said mouth opening and defining a port disposed over a portion of said mouth opening inwardly of said rim, the base member also comprising a base extension lying generally along said handle;
a valve member pivotally mounted on said base member and comprising a valve element in register with said port, a seal on said valve element at least partially underlying said flange, an actuator comprising a valve extension rigidly adjoining said valve element and projecting laterally outwardly therefrom and overlying said handle, said valve extension having a generally upwardly facing contact surface;
said pivotal mounting being cooperative between said extensions, laterally outwardly of said contact surface, and such that, when said actuator is depressed by downward force on said contact surface, said valve element pivots downwardly separating said seal from said flange, said pivotal mounting including a projection extending laterally means from one of said extensions, and means on the other of said extensions for receiving said projection at least one of said projection or receiving means being sufficiently resilient to allow said projection means to be snapped into said receiving means;
and a spring cooperative between said extensions and operative to bias said valve element upwardly with said seal against said flange.

11. The device of claim 10 wherein said projecting and receiving means are monolithically molded on their respective extensions, of a synthetic material.

12. The device of claim 10 wherein a movable part of said spring engages said valve extension under said contact surface.

13. The device of claim 12 wherein said base extension includes integrally molded holder means for said spring.

14. A drinking vessel comprising:
a hollow cup having an upper rim defining a mouth opening;
a lid assembly removably mounted on said cup and extending across said mouth opening, said lid assembly comprising
a base member so mounted on said cup and having a flange extending radially inwardly from said rim partly across said mouth opening and defining a port substantially centered over a substantial portion of said mouth opening inwardly of said rim, the flange having an upper surface inclined downwardly and inwardly;
a valve member pivotly mounted on said base member and comprising a valve element in register with said central port, a seal on said valve element at least partially underlying said flange, an actuator rigidly adjoining said valve element and disposed laterally outwardly thereof, said actuator having a generally upwardly facing contact surface, said pivotal mounting being such that, when said actuator is depressed by downward force on said contact surface, said valve element pivots downwardly, separating said seal from said flange;
and a spring cooperative between said base member and said valve member and operative to bias said valve element upwardly with said seal against said flange.

15. The device of claim 14 wherein said flange has a varying width, narrower at a first drinking position approximately 90° from said handle; and
said valve element and said port have transverse dimensions varying correspondingly to said flange width, wider adjacent said first drinking position.

16. The device of claim 15 wherein there is a second such drinking position generally diametrically opposite said first drinking position.

17. The drinking vessel of claim 14 wherein said hollow cup comprises an outer wall defining a handle and an inner wall within but spaced from said outer wall and defining the liquid containing hollow of said cup, the walls being joined adjacent said rim.

18. The device of claim 17 further comprising insulation material between said walls bonding said walls together.

19. The device of claim 17 wherein the upper end of said inner wall forms said rim and defines a downwardly opening recess receiving the upper end of said outer wall.

* * * * *